US012676862B2

(12) United States Patent
Morgan et al.

(10) Patent No.: US 12,676,862 B2
(45) Date of Patent: Jul. 7, 2026

(54) SYSTEMS AND METHODS FOR ANONYMOUS ADMINISTRATIVE LOGIN

(71) Applicant: ConnectWise, LLC, Tampa, FL (US)

(72) Inventors: Jacob Hamilton Morgan, Raleigh, NC (US); Berry Mayfield Reynolds, IV, Raleigh, NC (US)

(73) Assignee: ConnectWise, LLC, Tampa, FL (US)

( * ) Notice: Subject to any disclaimer, the term of this patent is extended or adjusted under 35 U.S.C. 154(b) by 256 days.

(21) Appl. No.: 18/193,974

(22) Filed: Mar. 31, 2023

(65) Prior Publication Data

US 2024/0333723 A1      Oct. 3, 2024

(51) Int. Cl.
| | |
|---|---|
| *H04L 9/40* | (2022.01) |
| *G06F 9/451* | (2018.01) |
| *G06F 21/62* | (2013.01) |

(52) U.S. Cl.
CPC ............ *H04L 63/105* (2013.01); *G06F 9/452* (2018.02); *G06F 21/6254* (2013.01); *H04L 63/102* (2013.01)

(58) Field of Classification Search
CPC ..... H04L 63/105; H04L 63/102; G06F 9/452; G06F 21/6254
See application file for complete search history.

(56) References Cited

U.S. PATENT DOCUMENTS

| | | | | |
|---|---|---|---|---|
| 7,584,239 B1 * | 9/2009 | Yan | .......................... | H04L 69/18 |
| | | | | 709/212 |
| 9,900,330 B1 * | 2/2018 | Dargude | ............. | H04L 63/1416 |

| | | | | |
|---|---|---|---|---|
| 10,715,507 B1 | 7/2020 | Spears et al. | | |
| 10,771,337 B1 * | 9/2020 | Das | ........................ | H04L 63/102 |
| 11,050,854 B1 * | 6/2021 | Kruger | .................... | H04L 67/10 |
| 11,379,252 B1 * | 7/2022 | Borg | ........................ | H04L 67/14 |
| 11,483,410 B1 * | 10/2022 | Fleck | .................... | H04L 51/046 |
| 12,526,286 B2 | 1/2026 | Morgan et al. | | |
| 2005/0080897 A1 * | 4/2005 | Braun | ................... | H04L 63/105 |
| | | | | 709/225 |

(Continued)

FOREIGN PATENT DOCUMENTS

| | | |
|---|---|---|
| WO | WO-2024/206971 A1 | 10/2024 |
| WO | WO-2024/206973 A1 | 10/2024 |

OTHER PUBLICATIONS

International Search Report and Written Opinion for International Application No. PCT/US24/22448 dated Jul. 16, 2024.

(Continued)

*Primary Examiner* — Jason Chiang
(74) *Attorney, Agent, or Firm* — Foley Hoag LLP; John D. Lanza; Joshua S. Matloff

(57) ABSTRACT

Systems and methods for end user elevation and anonymous administrative login are disclosed. An agent executing on a client device can provide a graphical element within a user interface presented by the client device upon detection of a request for elevated user privileges. Upon an interaction with the graphical element, the agent transmits, to a server, data corresponding to the request for elevated user privileges, and receives, from the server, a message indicating approval of the request for elevated user privileges. The agent provides, to the operating system of the client device, an indication that the request for elevated user privileges is approved.

16 Claims, 7 Drawing Sheets

(56) References Cited

U.S. PATENT DOCUMENTS

| | | | | |
|---|---|---|---|---|
| 2006/0123469 | A1* | 6/2006 | Lee | H04L 63/08 726/4 |
| 2006/0143447 | A1* | 6/2006 | Vasishth | H04L 63/102 713/166 |
| 2007/0199068 | A1 | 8/2007 | Russinovich et al. | |
| 2007/0226259 | A1 | 9/2007 | Kacin et al. | |
| 2009/0300736 | A1* | 12/2009 | Chen | G06F 21/6218 726/5 |
| 2011/0030045 | A1 | 2/2011 | Beauregard et al. | |
| 2011/0154465 | A1* | 6/2011 | Kuzin | H04L 67/08 726/9 |
| 2011/0239275 | A1 | 9/2011 | De Peuter et al. | |
| 2013/0055102 | A1* | 2/2013 | Matthews | H04L 67/08 715/740 |
| 2013/0060837 | A1* | 3/2013 | Chakraborty | G06F 11/3428 709/203 |
| 2013/0138765 | A1* | 5/2013 | Fielding | G06F 21/552 709/217 |
| 2013/0262560 | A1* | 10/2013 | Ivashin | H04L 67/08 709/203 |
| 2014/0289639 | A1* | 9/2014 | Halim | H04L 67/025 715/740 |
| 2015/0271200 | A1* | 9/2015 | Brady | H04L 63/1466 726/4 |
| 2015/0286389 | A1* | 10/2015 | Conover | G06F 9/45558 715/738 |
| 2016/0026813 | A1 | 1/2016 | Neitzel et al. | |
| 2017/0093910 | A1 | 3/2017 | Gukal et al. | |
| 2017/0111368 | A1 | 4/2017 | Hibbert et al. | |
| 2017/0201491 | A1* | 7/2017 | Schmidt | H04L 63/08 |
| 2017/0201588 | A1* | 7/2017 | Schmidt | H04L 63/105 |
| 2017/0289268 | A1* | 10/2017 | Behunin | H04L 67/142 |
| 2017/0346851 | A1 | 11/2017 | Drake | |
| 2018/0270249 | A1 | 9/2018 | Joshi | |
| 2018/0351961 | A1* | 12/2018 | Calcaterra | H04L 63/105 |
| 2019/0026445 | A1 | 1/2019 | Ginsberg et al. | |
| 2019/0065736 | A1* | 2/2019 | Dharmadhikari | G06F 9/45533 |
| 2019/0163458 | A1 | 5/2019 | Goodridge et al. | |
| 2019/0236293 | A1 | 8/2019 | Goodridge et al. | |
| 2019/0334922 | A1 | 10/2019 | Ratiner et al. | |
| 2020/0053162 | A1* | 2/2020 | Vajravel | H04L 61/5007 |
| 2020/0394270 | A1* | 12/2020 | Kaur | G06F 9/454 |
| 2020/0404007 | A1* | 12/2020 | Singh | G06F 16/24537 |
| 2020/0412723 | A1* | 12/2020 | Shankar | H04L 67/10 |
| 2020/0412765 | A1* | 12/2020 | Krishnamurthi | G06F 21/6218 |
| 2021/0294909 | A1 | 9/2021 | Sibiski, Jr. et al. | |
| 2022/0311777 | A1* | 9/2022 | Makenzi | H04L 63/029 |
| 2023/0071923 | A1* | 3/2023 | Chen | G06Q 10/063112 |
| 2024/0031340 | A1* | 1/2024 | Sahani | H04L 63/0421 |
| 2024/0214434 | A1* | 6/2024 | Clark, III | H04L 47/801 |
| 2024/0333722 | A1 | 10/2024 | Morgan et al. | |
| 2024/0406151 | A1* | 12/2024 | Bellenger | H04L 9/0866 |

OTHER PUBLICATIONS

Notice of Allowance for U.S. Appl. No. 18/193,955 dated Oct. 15, 2025.

Advisory Action for U.S. Appl. No. 18/193,955 dated Sep. 11, 2025.

Final Office Action for U.S. Appl. No. 18/193,955 dated Jul. 25, 2025.

International Search Report and Written Opinion for International Application No. PCT/US24/22452 dated Jul. 16, 2024.

Non-Final Office Action for U.S. Appl. No. 18/193,955 dated Feb. 13, 2025.

* cited by examiner

100

200A

200A

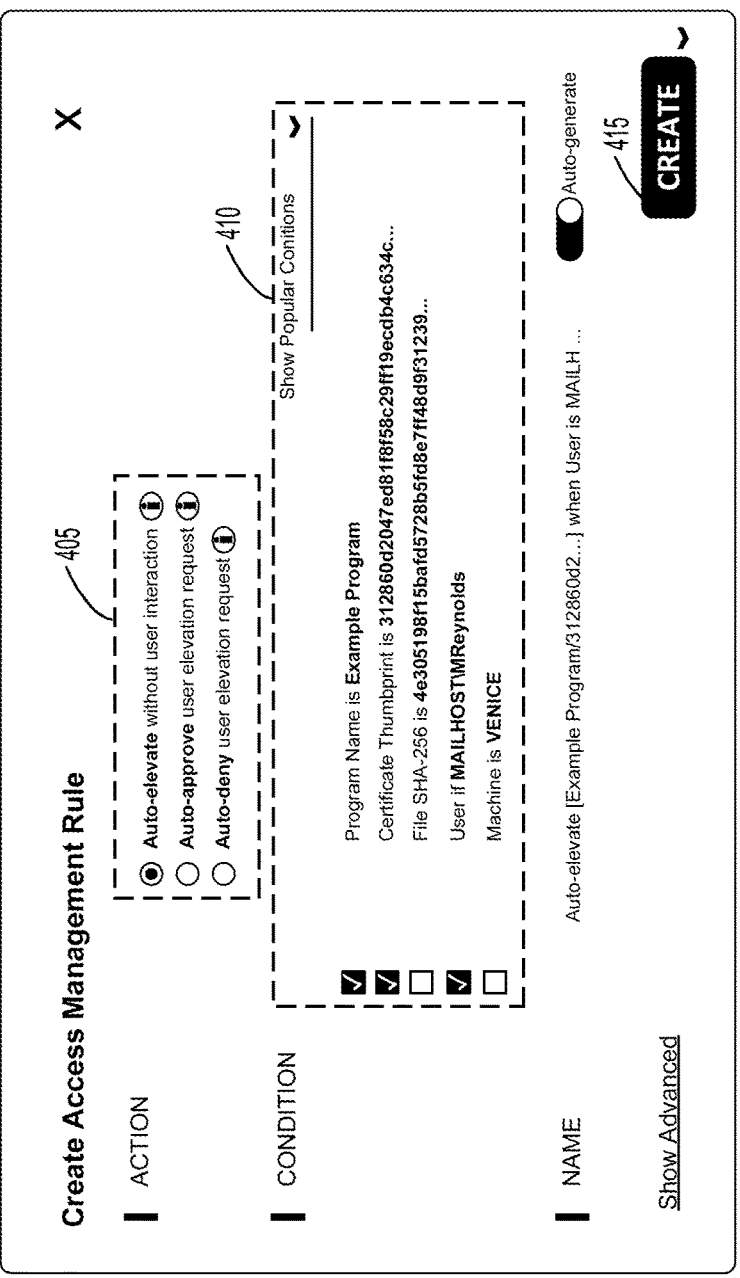

Create Access Management Rule ✕

400 — 405 — 410 — 415

ACTION

- ⦿ Auto-elevate without user interaction ⊕⊝
- ◯ Auto-approve user elevation request ⊕
- ◯ Auto-deny user elevation request ⊕

CONDITION

☑ Program Name is Example Program
☑ Certificate Thumbprint is 3128e0d2047ed81f8f58c29ff19ecdb4c634c…
☐ File SHA-256 is 4e305198f15bafd5728b5fd8e7ff48d9f31239…
☑ User if MAILHOST\MReynolds
☐ Machine is VENICE

Show Popular Conitions ⟩

NAME

Auto-elevate [Example Program/3128e0d2…] when User is MAILH …

Auto-generate ◯

CREATE ⟩

Show Advanced

510 — PROVIDE A GRAPHICAL ELEMENT WITHIN A USER INTERFACE PRESENTED BY AN OPERATING SYSTEM

520 — TRANSMIT DATA CORRESPONDING TO A REQUEST FOR USER PRIVILEGES

530 — RECEIVE A MESSAGE INDICATING APPROVAL OF THE REQUEST FOR ELEVATED USER PRIVILEGES

540 — PROVIDE AN INDICATION THAT THE REQUEST FOR ELEVATED USER PRIVILEGES IS APPROVED

600

SYSTEMS AND METHODS FOR ANONYMOUS ADMINISTRATIVE LOGIN

FIELD OF THE DISCLOSURE

The present disclosure generally relates to user privilege management in networked computer environments, particularly the use of account elevation without requiring entry of credentials.

BACKGROUND

Computer systems use security features to guard against unauthorized access by limiting the privileges of users who access said systems. One way to protect against unauthorized access is to provide a prompt that requests authentication credentials when users attempt to perform actions that require administrative-level privileges. However, such prompts often merely request standard authentication credentials, and are only as secure as the credentials themselves. The use of such prompts may therefore result in unintended security breaches if credentials become compromised.

SUMMARY

The systems and methods of this technical solution provide techniques to overcome security issues in computer systems where security credentials may be shared or compromised. The systems and methods described herein eliminate the need for shared administrator credentials, and provides techniques to secure, monitor, and control access across a computer environment remotely. To do so, the systems and methods described herein can utilize an agent provided to client devices in the computer environment to automatically request remote elevation of certain user actions in response to administrative elevation requests. Additionally, the systems and methods described herein provide techniques for automatically invoking remote elevation during remote access sessions. Servers that process the requests for automatic elevation can implement rules or conditions to automatically approve or deny some requests. In addition, the techniques described herein enable a technician to request a temporary administrator logon to complete their work.

One aspect of the present disclosure is directed to a method. The method may be performed, for example, by a client device including one or more processors and memory. The method includes providing a graphical element within a user interface presented by an operating system of the client device responsive to detection of a request for elevated user privileges. The method includes transmitting, by the agent to a server, data corresponding to the request for elevated user privileges responsive to an interaction with the graphical element. The method includes receiving a message indicating approval of the request for elevated user privileges. The method includes providing, to the operating system of the client device, an indication that the request for elevated user privileges is approved.

In some implementations, the method includes generating an entry identifying the agent in a registry of the operating system. In some implementations, the method includes determining one or more of a program name of a program executed by the client device that initiated the request for elevated user privileges, a publisher of the program, a file path identifying a storage location of the program, a file hash of the program, or a username associated with the request for elevated user privileges. In some implementations, the method includes transmitting, to a second server, a file corresponding to the request for elevated user privileges; and receiving, from the second server, virus scan data generated based on the file.

In some implementations, the method includes providing, within the user interface presented by the operating system, a field that receives text input; and transmitting the text input as part of the data corresponding to the request for elevated user privileges. In some implementations, the method includes storing the agent in memory of the client device as a dynamic library. In some implementations, the method includes generating a timestamp corresponding to the request for elevated user privileges.

In some implementations, the method includes providing, responsive to transmitting the data corresponding to the request for elevated user privileges, a second graphical element within the user interface presented by the operating system, the second graphical element indicating that approval for elevated user privileges has been requested. In some implementations, the method includes determining a certificate thumbprint of a digital certificate corresponding to a program that initiated the request for elevated user privileges. In some implementations, the message comprises an authentication credential for the operating system, and providing the indication that the request for elevated user privileges is approved includes providing the authentication credential to the operating system.

At least one other aspect of the present disclosure is directed to a system. The system includes a client device that executes an agent. The system can provide a graphical element within a user interface presented by an operating system of the client device responsive to detection of a request for elevated user privileges. The system can transmit, to a server, data corresponding to the request for elevated user privileges responsive to an interaction with the graphical element. The system can receive, from the server, a message indicating approval of the request for elevated user privileges. The system can provide, to the operating system of the client device, an indication that the request for elevated user privileges is approved.

In some implementations, the system can generate an entry identifying the agent in a registry of the operating system. In some implementations, the system can determine one or more of a program name of a program executed by the client device that initiated the request for elevated user privileges, a publisher of the program, a file path identifying a storage location of the program, a file hash of the program, or a username associated with the request for elevated user privileges.

In some implementations, the system can transmit, to a second server, a file corresponding to the request for elevated user privileges; and receive, from the second server, virus scan data generated based on the file. In some implementations, the system can provide, within the user interface presented by the operating system, a field that receives text input for display; and transmit the text input as part of the data corresponding to the request for elevated user privileges.

In some implementations, the system can store the agent in memory of the client device as a dynamic library. In some implementations, the system can generate a timestamp corresponding to the request for elevated user privileges. In some implementations, the system can provide, responsive to transmitting the data corresponding to the request for elevated user privileges, a second graphical element within the user interface presented by the operating system, the second graphical element indicating that approval for elevated user privileges has been requested.

In some implementations, the system can determine a certificate thumbprint of a digital certificate corresponding to a program that initiated the request for elevated user privileges. In some implementations, the message comprises an authentication credential for the operating system, and the system can provide the indication that the request for elevated user privileges is approved by providing the authentication credential to the operating system.

Yet another aspect of the present disclosure is directed to another method. The method may be performed by a client device executing an agent. The method includes determining that a remote desktop session is actively controlling functionality of the client device. The method includes providing a graphical element within a user interface presented by an operating system of the client device responsive to detection of a request for elevated user privileges via the remote desktop session. The method includes transmitting data corresponding to the request for elevated user privileges and the remote desktop session responsive to an interaction with the graphical element. The method includes receiving, from the server, a message indicating approval of the request for elevated user privileges. The method includes providing, to the operating system of the client device, an indication that the request for elevated user privileges is approved.

In some implementations, the method includes determining that the remote desktop session is not actively controlling functionality of the client device; and providing an indication not to display the graphical element within a second user interface provided by the operating system responsive to detection of a second request for elevated user privileges. In some implementations, determining that the remote desktop session is actively controlling functionality of the client device comprises accessing information stored on the client device that indicates the remote desktop session is active.

In some implementations, the method includes generating an entry identifying the agent in a registry of the operating system. In some implementations, the method includes determining an identifier of a remote computing device that is utilizing the remote desktop session to control the client device; and transmitting the identifier of the remote computing device to the server as part of the data corresponding to the request for elevated user privileges. In some implementations, the method includes determining one or more of a program name of a program executed by the client device that initiated the request for elevated user privileges, a publisher of the program, a file path identifying a storage location of the program, or a file hash of the program.

In some implementations, the method includes determining a remote user profile utilized to initiate the remote desktop session. In some implementations, the message comprises an authentication credential for the operating system that is generated for the remote desktop session, and providing the indication that the request for elevated user privileges is approved includes providing the authentication credential to the operating system. In some implementations, the method includes storing the agent in memory of the client device as a dynamic library. In some implementations, determining that the remote desktop session is actively controlling functionality of the client device comprises determining that the remote desktop session initiated the request for elevated user privileges.

At least one other aspect of the present disclosure is directed to another system. The system includes a client device that executes an agent. The system can determine that a remote desktop session is actively controlling functionality of the client device. The system can provide a graphical element within a user interface presented by an operating system of the client device responsive to detection of a request for elevated user privileges via the remote desktop session. The system can transmit, to a server, data corresponding to the request for elevated user privileges and the remote desktop session responsive to an interaction with the graphical element. The system can receive, from the server, a message indicating approval of the request for elevated user privileges. The system can provide, to the operating system of the client device, an indication that the request for elevated user privileges is approved.

In some implementations, the system can determine that the remote desktop session is not actively controlling functionality of the client device; and provide an indication not to display the graphical element within a second user interface provided by the operating system responsive to detection of a second request for elevated user privileges. In some implementations, the system can determine that the remote desktop session is actively controlling functionality of the client device by accessing information stored on the client device that indicates the remote desktop session is active. In some implementations, the system can generate an entry identifying the agent in a registry of the operating system.

In some implementations, the system can determine an identifier of a remote computing device that is utilizing the remote desktop session to control the client device; and transmit the identifier of the remote computing device to the server as part of the data corresponding to the request for elevated user privileges. In some implementations, the system can determine one or more of a program name of a program executed by the client device that initiated the request for elevated user privileges, a publisher of the program, a file path identifying a storage location of the program, or a file hash of the program.

In some implementations, the system can determine a remote user profile utilized to initiate the remote desktop session. In some implementations, the message comprises an authentication credential for the operating system that is generated for the remote desktop session, and the system can provide the indication that the request for elevated user privileges is approved by providing the authentication credential to the operating system. In some implementations, the system can store the agent in memory of the client device as a dynamic library. In some implementations, the system can determine that the remote desktop session is actively controlling functionality of the client device by determining that the remote desktop session initiated the request for elevated user privileges.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 depicts an example graphical user interface that may be displayed via a computer system to create rules for automatically managing remote elevation of user privileges, in accordance with one or more implementations;

DETAILED DESCRIPTION

Figure 1:
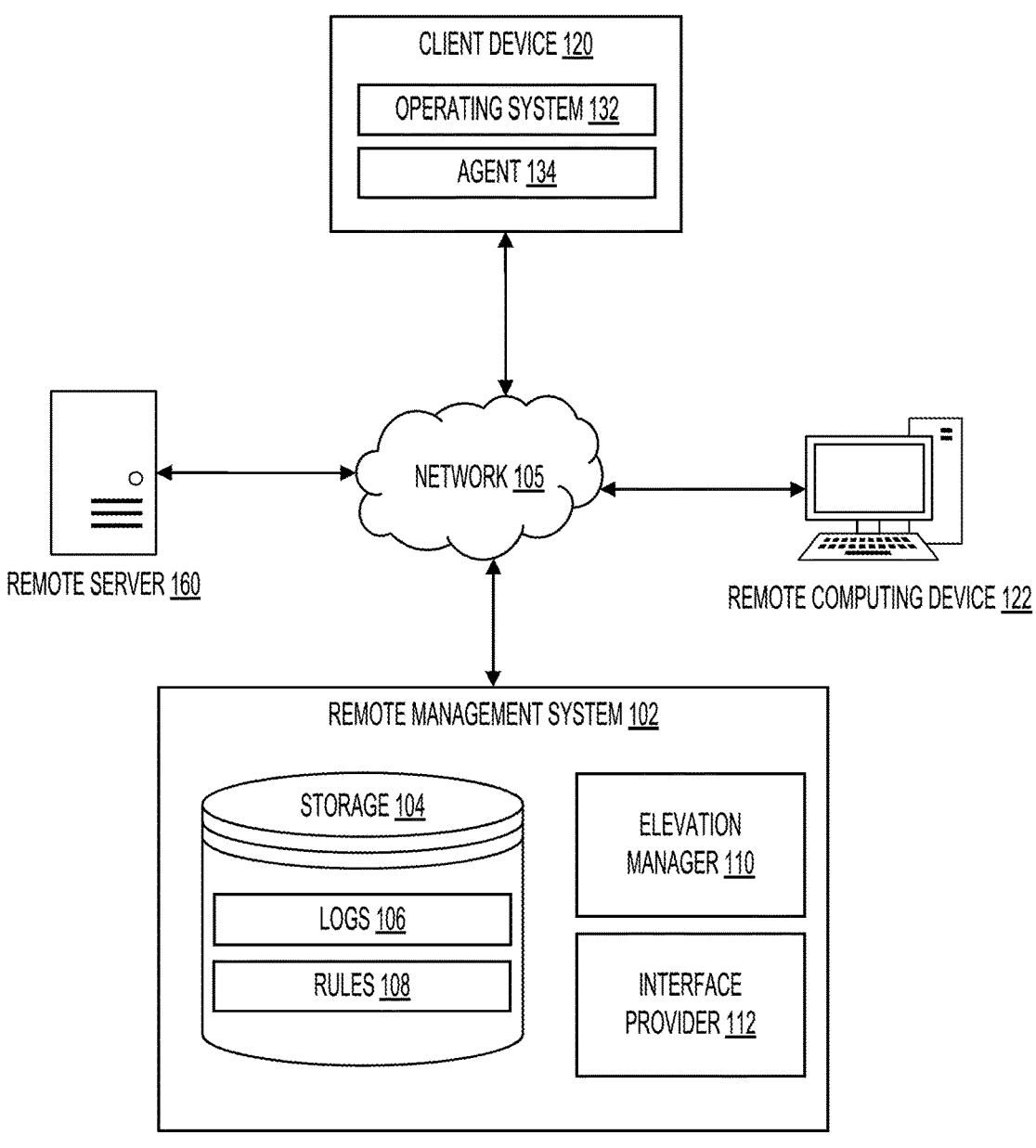
FIG. 1 depicts an illustrative block diagram of an example embodiment of a system for end user privilege elevation and anonymous administrative login, in accordance with one or more implementations.

Below are detailed descriptions of various concepts related to, and implementations of, techniques, approaches, methods, apparatuses, and systems for location-based assignment of client device data. The various concepts introduced above and discussed in greater detail below may be implemented in any of numerous ways, as the described concepts are not limited to any particular manner of implementation. Examples of specific implementations and applications are provided primarily for illustrative purposes.

User privileges can be implemented by computer systems to prevent unauthorized access to administrative functionality or protected resources. One way to manage access to such functionality or resources is to provide a prompt that requests authentication credentials when users attempt to perform actions that require administrative-level privileges. However, such prompts often merely request standard authentication credentials, and are only as secure as the credentials themselves. The use of such prompts may therefore result in unintended security breaches if credentials become compromised.

Despite these security concerns with respect to the use of administrative credentials, end users sometimes have a legitimate need for elevated privileges (e.g., privileges that enable administrative actions, a selected subset of available administrative actions, etc.). The systems and methods described herein provide an agent that enables an end user to request elevation from a remote management system in lieu of providing administrative credentials. The remote management system can evaluate the request and determine whether the request is approved or denied. In some implementations, if an application matches specified criteria, the remote management system may automatically approve or deny the request, based on rules maintained by the remote management system. Records of the elevation prompt, the request for elevated privileges, and the approval or denial are recorded in a log for auditing purposes.

The systems and methods described herein further provide techniques for that enable the use credential-less administrator privileges during remote access sessions, such as remote desktop sessions. In one example, remote access sessions may be utilized by remote technicians to service or diagnose issues on a client device. Rather than typing in a shared password to elevate, a user connecting to a client device can request elevation from the remote management system or, if the remote user is associated with corresponding permissions, self-elevate. In some implementations, the remote management system may a temporary, credential-less administrator logon via an interface at the client device.

The systems and methods described herein therefore improve the security of computer systems by eliminating the need for shared authentication credentials to access administrative functionality of client devices. In conventional systems, shared credentials pose an increased security threat to computer systems because shared credentials may unnecessarily provide multiple users access to the administrative actions. When using shared credentials, it is challenging to trace and manage which users have access to the credentials, and which users performed a particular action or change. Further shared credentials increase the likelihood of unauthorized access or misuse of the privileged administrative functionality. By eliminating the shortcomings of conventional credential sharing in computer systems, the systems and methods described herein provide improvements to the field of computer network security.

FIG. 1 depicts an illustrative block diagram of an example embodiment of a system 100 for end user privilege elevation and anonymous administrative login, in accordance with one or more implementations. The system 100 includes a remote management system 102, a network 105, one or more client devices 120, one or more remote computing devices 122, and one or more remote servers 160. The client device 120 can include an operating system 132 and an agent 134. The remote management system 102 includes a storage 104, an elevation manager 110, and an interface provider 112. The components or functions of the system 100 (e.g., the remote management system 102, the client device 120, the remote computing device 122, and the remote server 160) may communicate with one another the network 105. The system 100 may perform any of the operations described in connection with FIGS. 2A, 2B, 3, 4, 5, and 6.

Each of the components (e.g., the remote management system 102, the client device 120, the remote computing device 122, and the remote server 160, the operating system 132, the agent 134, the elevation manager 110, the interface provider 112, the storage 104, etc.) of the system 100 can be implemented using the hardware components or a combination of software with the hardware components of a computing system, such as the computing system 100 detailed herein in conjunction with FIGS. 1A-1D, or any other computing system described herein. Each of the components of the system 100 can perform the functionalities detailed herein.

Each of the remote management system 102, the client device 120, the remote computing device 122, and the remote server 160 can respectively include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. In some implementations, the remote management system 102 can include one or more computing devices or servers that can perform various functions as described herein. In some implementations, remote management system 102 may be a part of a distributed computing platform, such as a cloud computing system.

The network 105 can include computer networks such as the Internet, local, wide, satellite, or other area networks, intranets, other computer networks such as voice or data mobile phone communication networks, and combinations thereof. The client device 120 of the system 100 can communicate via the network 105, for instance with the remote management system 102, the remote computing device 122, the remote server 160, or in some implementations other client devices 120. The network 105 may be any form of computer network that can relay information between the remote management system 102, the client device 120, the remote computing device 122, the remote server 160, and one or more information sources, such as web servers or external databases, amongst others. In some implementations, the network 105 may include the Internet and/or other types of data networks, such as a local area network (LAN), a wide area network (WAN), a cellular network, a satellite network, or other types of data networks. The network 105 may also include any number of computing devices (e.g., computers, servers, routers, network switches, etc.) that are configured to receive or transmit data within the network 105. The network 105 may further include any number of hardwired or wireless connections.

The client device 120 includes the operating system 132, which may be stored in the memory of the client device 120 and executed by one or more processors of the client device 120. The operating system 132 can include a software system that manages computer hardware and software resources for the client device 120 and provides common services for computer programs executing on the client device 120. The operating system 132 can manage the execution of computer programs or processes by allocating system resources such as processor time, memory, and input/output (I/O) devices. The operating system 132 can provide process scheduling, inter-process communication, and synchronization to ensure that multiple programs can run efficiently and without interference on the client device 120.

The operating system 132 can manage computer memory to ensure that each program or process has access to the necessary memory resources. The operating system provides memory allocation, virtual memory, and memory protection to prevent programs from interfering with each other's memory space. The operating system 132 can manage files and storage devices of the client device 120. The operating system 132 can provide and manage file systems, file access control, and storage management services to ensure that data is stored and accessed efficiently and securely. The operating system 132 can manage devices such as keyboards, mice, printers, and network interfaces of the client device 120. The operating system 132 can provide device drivers, device detection, and device access control to ensure that devices are used efficiently and securely.

The operating system 132 can provide one or more a user interface for interacting with the client device 120 and the various programs or processes executing thereon. For example, the operating system 132 can provide one or more graphical user interfaces, command-line interfaces, and other input/output methods to facilitate communication between the user and the computer. Some example user interfaces that may be provided in part by the operating system 132 are described in connection with FIGS. 2A and 2B.

The operating system 132 can provides security features to protect the client device 120 and its data from unauthorized access. The operating system 132 provides authentication, access control, encryption, and other security features to ensure device security. The operating system 132 can utilize access control mechanisms to control which users or processes can access specific system resources, such as files, folders, and devices. Access control mechanisms may include file and folder permissions, user groups, and role-based access control. In some implementations, the operating system 132 can utilize authentication credentials, such as passwords, biometric devices, or smart cards, to verify the identity of users and grant authorized users access to system resources and administrative functionality.

In some implementations, the operating system 132 can interact with the agent 134 when a user, program, or other software attempts to invoke administrative functionality. The operating system 132 can detect when an application or user has requested an action that requires elevated user privileges. In some implementations, applications or processes that implement functionality of the operating system 132 that requires elevated privileges can include a file or metadata that specifies the requested privileges. The file or metadata can include information about the application or process, such as the application or process name, version, and requested privileges. In some implementations, when the application or process is launched, executes, or performs an action (e.g., an application programming interface (API) call or operating system call) that requires elevated privileges (e.g., administrative privileges), the operating system 132 can access the file or metadata to determine whether it requires elevated privileges.

In some implementations, the operating system 132 can detect when an application or user has requested an action that requires elevated user privileges based on a type of application or process that has been executed. For example, the operating system 132 (or configuration settings of the client device 120) may require that certain types of programs must have elevated user privileges to be executed. For example, the operating system 132 can detect when an application is being installed or uninstalled, and determine that the installation or uninstallation requires elevated privileges.

Upon detecting that a user or program has requested elevated user preferences, the operating system 132 can generate and present a prompt, such as the prompt described in connection with FIGS. 2A and 2B. To generate the prompt, the operating system 132 may invoke functionality of the agent 134. To do so, the can access a registry of the operating system 132 to identify the agent 134. The registry can be stored and maintained by the operating system 132, and can include a hierarchical database that stores configuration settings and options for the operating system 132 and software, programs, processes, or services of the client device 120. The agent 134 may be identified by a corresponding entry in the registry. The entry can indicate that the agent 134 should be executed or otherwise invoked upon detection of a request for elevated user privileges.

The agent 134 may be a library, program, combinations thereof, or other type of software that can be executed by the client device 120 or by the operating system 132 of the client device upon detecting a request for elevated user privileges. The agent 134 may provide computer-executable code (e.g., functions, interfaces, etc.) that enable the agent 134 to interact with the operating system 132, and vice versa. The agent 134 may be stored in one or more files, programs, or regions of memory of the client device. The agent 134 may be implemented in software, hardware, or combinations of hardware and software. The agent 134 may be accessed by the operating system 132 once the operating system 132 identifies the agent 134 in the registry. In some implementations, the agent 134 may be executed as a background service on the client device 120 to perform any of the functionality described herein. The operating system 132 can execute the agent 134, which can generate one or more graphical elements for display in a prompt provided by the operating system 132. Further details of the functionality of the agent 134 are described in connection with FIGS. 2A and 2B.

Figure 2A:
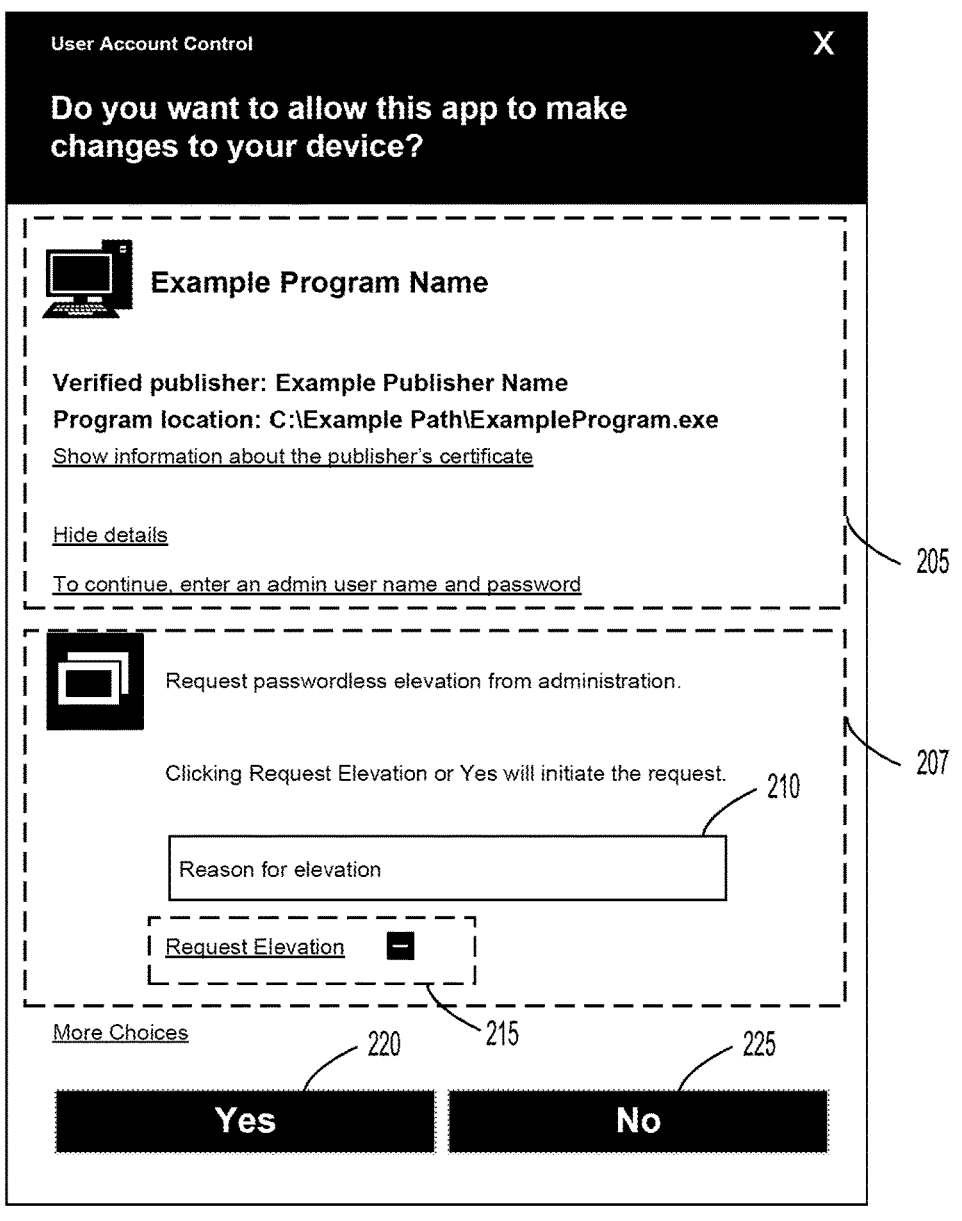
FIGS. 2A and 2B depict example graphical user interfaces that may be displayed on a client device requesting remote elevation of user privileges, in accordance with one or more implementations.
Figure 2B:
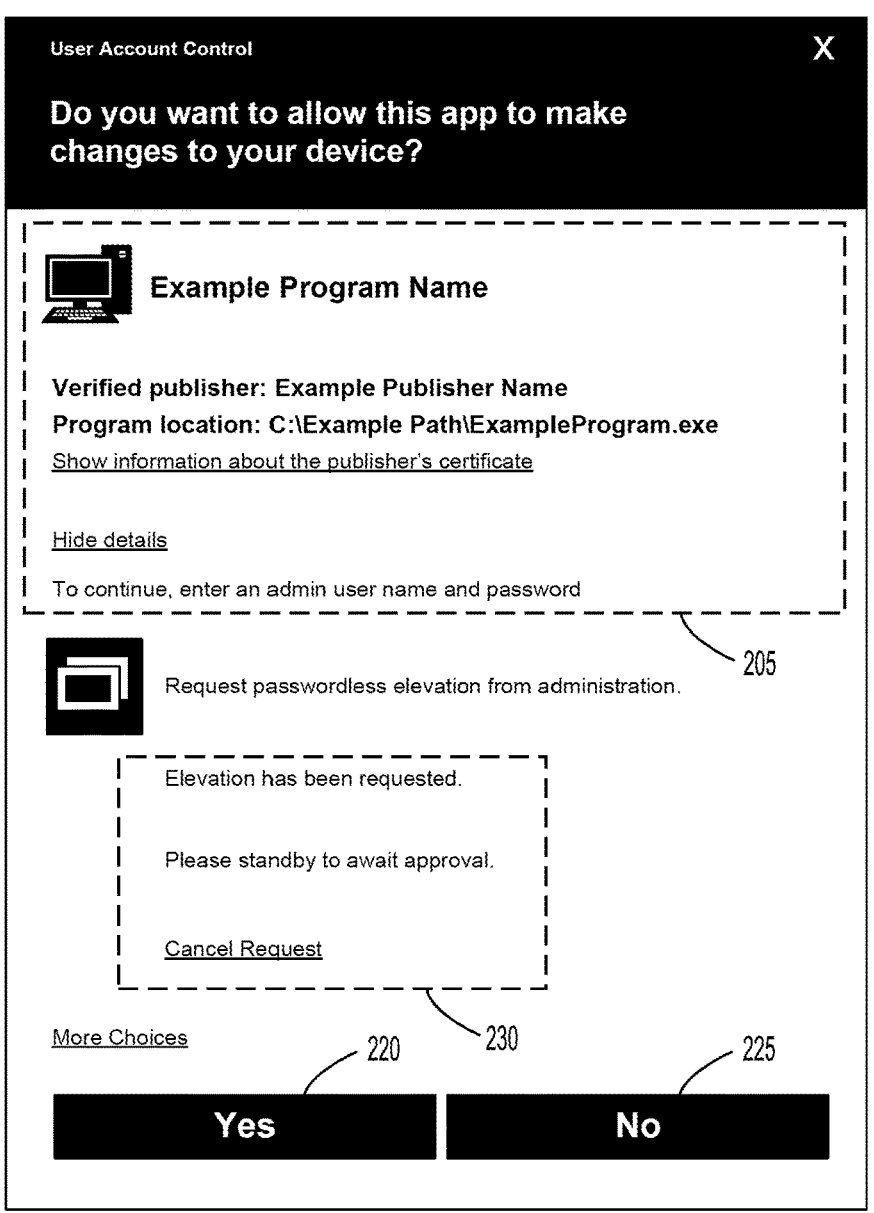

Referring to FIGS. 2A and 2B in the context of the components described in FIG. 1, depicted are views 200A and 200B of prompts that may be displayed on the client device 120 upon a request for remote elevation of user privileges. In this example, the program "Example Program Name" has attempted to perform functionality that requires elevated user privileges (e.g., administrative permissions, etc.), which has been detected by the operating system 132. Referring to FIG. 2A in the context of the components described in FIG. 1, the operating system 132 has generated the prompt shown in the view 200A, which includes information relating to the program in the region 205. In the region 205, the operating system provides the name of the program (e.g., "Example Program Name"), an identifier of the publisher of the program (e.g., "Example Publisher Name"), and a file system path corresponding to where the program is stored.

Additionally, the operating system 132 provides interactive elements (shown as underlined text in the prompt), which enable a user to invoke additional functionality. For example, upon interaction with the "Hide Details" graphical element, the operating system 132 may hide the details in the region 205. The agent 134 can provide executable instructions, data, or metadata that causes generation of the region 207 in the prompt, which can include one or more graphical elements. The region 207 can include a text-entry field, which can receive user-entered text describing a reason that elevated user privileges are requested. The region 207 can include an elevation graphical element 215, shown here as the "Request Elevation" interactive element. It will be appreciated that any type of button, link, or graphical element may be made interactive by the computer-executable instructions of the agent 134.

Upon an interaction with the elevation graphical element 215, the agent 134 can transmit data corresponding to the request for elevated user privileges to the remote management system 102. The data can include any information relating to the program requesting elevated privileges, the user account requesting privileges, the client device 120, the agent, among other data. Further details of the data transmitted to the remote management system 102 are described in connection with FIG. 3. Once the request has been transmitted to the remote management system 102, the agent 134 can execute instructions that cause the region 207 of the prompt to change, as shown in FIG. 2B. Referring to FIG. 2B, the region 207 on the prompt has been modified to remove the interactive graphical elements. In its place, the agent 134 has caused generation of the region 230 on the prompt. As shown, the region 230 includes an indication that elevated user privileges have been requested.

The remote management system 102 can perform an action to determine whether or not to approve the request, further details of which are described herein. The remote management system 102 can then transmit a message indicating approval or denial of the elevation request, which can be received by the agent 134. In an embodiment, the message can include one more credentials maintained or generated by the remote management system 102, which the agent 134 can provide to the operating system 132 to satisfy the requirements to elevate user privileges. In another embodiment, the agent 134 itself may generate one or more credentials based on information received from the remote management system 102. The agent 134 can then provide the credential to the operating system 132 to satisfy the requirements to elevate user privileges. In yet another embodiment, the agent 134 can provide an indication that the request for elevated privileges has been approved by the remote management system 102 to the operating system 132, which can then grant the elevated privileges accordingly.

In some implementations, prior to providing the graphical elements in the region 207, the agent 134 can determine whether a remote desktop session is actively controlling functionality of the client device 120. A remote desktop session can be a type of session that allows a remote user to remotely access and control the client device 120 (e.g., including the graphical user interface) using another computer, such as the remote computing device 122, via the network 105. In one example, the client device 120 can act as a host for the remote desktop session and the remote computing device 122 can act as a client that controls the client device 120 via the remote desktop session. Remote desktop sessions can be established using various protocols and technologies, such as the Remote Desktop Protocol (RDP) or the Virtual Network Computing (VNC) protocol. In a remote desktop session, input and actions at the remote computing device 122 can be transmitted to the client device 120, which processes the input as if the input were happening locally and sends updated graphical interface data back to the remote computing device 122.

To determine whether a remote desktop session is actively controlling functionality of the client device 120, the agent 134 may access one or more APIs of the operating system 132 to enumerate each session that is active on the client device 120. One session can be a user session, which is provided by the operating system 132 when a user locally logs into the client device 120 using credentials or via the techniques described in further detail herein. The remote desktop session may also be enumerated and identified by the agent 134 using such APIs. In some implementations, the agent 134 can access one or more registry entries of the registry of the operating system 132 that indicate whether a remote desktop session is actively controlling functionality of the client device 120.

Furthering this embodiment, if the agent 134 determines that a remote desktop session is actively controlling functionality of the client device 120, the agent 134 can provide the graphical element(s) in the regions 207 and 230 of the prompt provided by the operating system 132, as shown in FIGS. 2A and 2B. However, in some implementations, if the agent 134 determines that no remote desktop session is actively controlling functionality of the client device 120, the agent 134 may not display the graphical elements in the region 207 and 230 as shown in FIGS. 2A and 2B. Instead, the agent 134 may terminate, and the operating system 132 can provide a prompt to enter user credentials, for example. In some implementations, the agent 134 may instead provide a signal to the operating system 132 to display a default credential interface (e.g., username, password) in lieu of the graphical elements shown in the regions 207 and 230.

Referring back to FIG. 1, in some implementations, the operating system 132 may execute the agent in response to a request to login to the client device 120. The operating system 132 may prompt the user for login information when a user session is to be established, such as when the client device 120 restarts or reboots, when a user logs out of the client device 120 or terminates a current session, or when the remote computing device 122 attempts to initiate a remote desktop session 122 on the client device 120. In some implementations, prior to the operating system 132 presenting a login screen, the operating system 132 can invoke the functionality of the agent 134, as described herein. The agent 134 can then provide graphical elements similar to those described in connection with FIGS. 2A and 2B, in order to request credentials (or simply authorization) to initiate a session at the client device. In such implementations, rather than transmitting a request for elevated privileges, the agent 134 can transmit a request for login credentials or authorization to login to a session on the client device 120, which can be authorized or denied by the remote management system 102, which transmits a message indicating the same to the agent 134. The request for login credentials may be a request for administrative login credentials (e.g., with elevated privileges) or standard credentials (e.g., with standard user privileges). The agent 134 can then provide received login credentials to the operating system 132, generate login credentials for the session based on received data, or provide an indication that login to an existing session or user account has been authorized by the remote management system 102, to initiate the session.

Referring now to the operations of the remote management system 102, the remote management system 102 can include the storage 104, the elevation manager 110, and the interface provider 112. The storage 104 can be a computer-readable memory that can store or maintain any of the information described herein, including the logs 106 and the rules 108. The storage 104 can maintain one or more data structures, which may contain, index, or otherwise store each of the values, pluralities, sets, variables, vectors, numbers, or thresholds described herein. The storage 104 can be accessed using one or more memory addresses, index values, or identifiers of any item, structure, or region maintained in the storage 104. The storage 104 can be accessed by any of the components of the remote management system 102. In some implementations, the storage 104 can be internal to the remote management system 102. In some implementations, the storage 104 can exist external to the remote management system 102, and may be accessed via the network 105. The storage 104 can be distributed across many different computer systems or storage elements, and may be accessed via the network 105 or a suitable computer bus interface.

The storage 104 can store the logs 106, which can include any of the information described herein relating to requests for elevated user privileges, login credentials, remote desktop sessions, or communications involving the remote management system 102. For example, the elevation manager 110 can store an entry in the logs 106 for each request for elevated user privileges or login credentials received from one or more client devices 120. The entry can include any information in the request (e.g., described in further detail in connection with FIG. 3), and an indication of whether the respective request was approved or denied. Logs may be accessed and displayed by the interface provider 112, for example, in response to requests from the remote computing device 122 or other computing devices via the network 105.

The storage 104 can store the rules 108, which can include any automatic rules or configuration settings that configure the operations of the remote management system 102. The rules 108 may include any conditions or rules defined for specific programs, publishers, or client devices 120, for example, to automatically approve elevation of user privileges. The rules may be defined via one or more graphical user interfaces provided by the interface provider 112. The rules may include one or more predetermined conditions that, if satisfied, cause the elevation manager 110 to automatically approve requests for elevated user privileges or login (e.g., standard or administrative login as defined by the respective rule 108, etc.). Further details of the rules 108 are described in connection with FIG. 4.

The remote management system 102 can execute the elevation manager 110, which can receive and process requests for elevated user privileges or login credentials or authorization from client devices 120. The elevation manager 110 can receive a request for elevated user privileges, which may include information relating to the program, user, or client device requesting elevated privileges. For example, the request may include a program name of the program executed by the client device 120 that initiated the request for elevated user privileges, a publisher of the program, a file path identifying a storage location of the program, a file hash of the program, a username or account identifier of a user account used to transmit request for elevated user privileges, or a group identifier for the user account. In implementations where the request is transmitted via a remote desktop session hosted by the client device 120, information relating to the request can include data relating to the remote desktop session, such as identifiers of a user of the remote computing device 122 (e.g., which is requesting elevated user privileges via the remote desktop session, or requesting administrative or standard login to initiate a remote desktop session, etc), identifier(s) or data relating to the remote computing device 122, information relating to the remote desktop session, among other data.

In some implementations, the request may include information relating to the program retrieved from the remote server 160. The remote server 160 may implement one or more virus or malware scanning functionalities. In some implementations, the remote server 160 can implement and aggregate multiple different antivirus scanners and other security tools to scan submitted content and provides users with detailed reports on any detected threat. In some implementations, the agent 134 can transmit the program (including any information managed or accessed by the program)

requesting elevated privileges to the remote server 160 to perform a virus scan prior to transmitting the request for elevated privileges to the remote management system 102. The remote server 160 can execute one or more virus scans on the received file, and transmit a corresponding virus scan summary or report to the agent 134. In some implementations, the agent 134 can include the summary or report in the request for elevated privileges received by the elevation manager 110.

Upon receiving a request (e.g., for elevated user privileges or for login credentials), the elevation manager 110 can generate a corresponding entry in the logs 106. The entry may include an indication of whether the request has been approved or denied. The elevation manager 110 can compare the information received in the request to the conditions of the rules 108 to determine whether the request satisfies a rule for automatic approval. If the request is satisfied, the elevation manager 110 can determine that the request should be approved. If the request does not satisfy a rule 108 for automatic approval, the elevation manager 110 can indicate that the request is pending manual approval in the logs. Entries that are indicated as corresponding to manual approval can be tagged or flagged as a pending request in the logs 106. Pending requests can be displayed to operators or users of the remote management system 102 by the interface provider 112.

The interface provider 112 can provide graphical user interfaces to configure the functionality of or operate the remote management system 102. In some implementations, the interface provider 112 can provide a web-based interface to one or more computing devices that login to or otherwise are authenticated to access the remote management system 102. For example, the remote management system 102 may be a webserver that provides one or more webpages including various graphical user interfaces described herein, including the graphical user interfaces 300 and 400 described in connection with FIGS. 3 and 4. In some implementations, the interface provider 112 may receive and respond to HTTP/HTTPS requests transmitted via computing systems via the network 105, such as the remote computing device 122. In one example, the remote computing device 122 or the client device 120 can utilize one or more web browser applications or other native applications to access the graphical user interfaces provided by the remote management system 102.

When a request for a resource maintained by the remote management system 102 is received from a computing device via the network 105, the interface provider 112 can process the request by locating the requested resource and transmitting the resource to the requesting computing device. For example, the interface provider 112 can transmit graphical user interfaces in non-limiting example formats such as HTML, CSS, JavaScript, images, or content files. The interface provider 112 can execute server-side scripts, such as PHP, ASP.NET, or Python, which may generate dynamic content that may be provided to one or more computing devices accessing the remote management system 102 via the network 105. Further details of the functionality of the interface provider 112 are described in connection with FIGS. 3 and 4.

Figure 3:
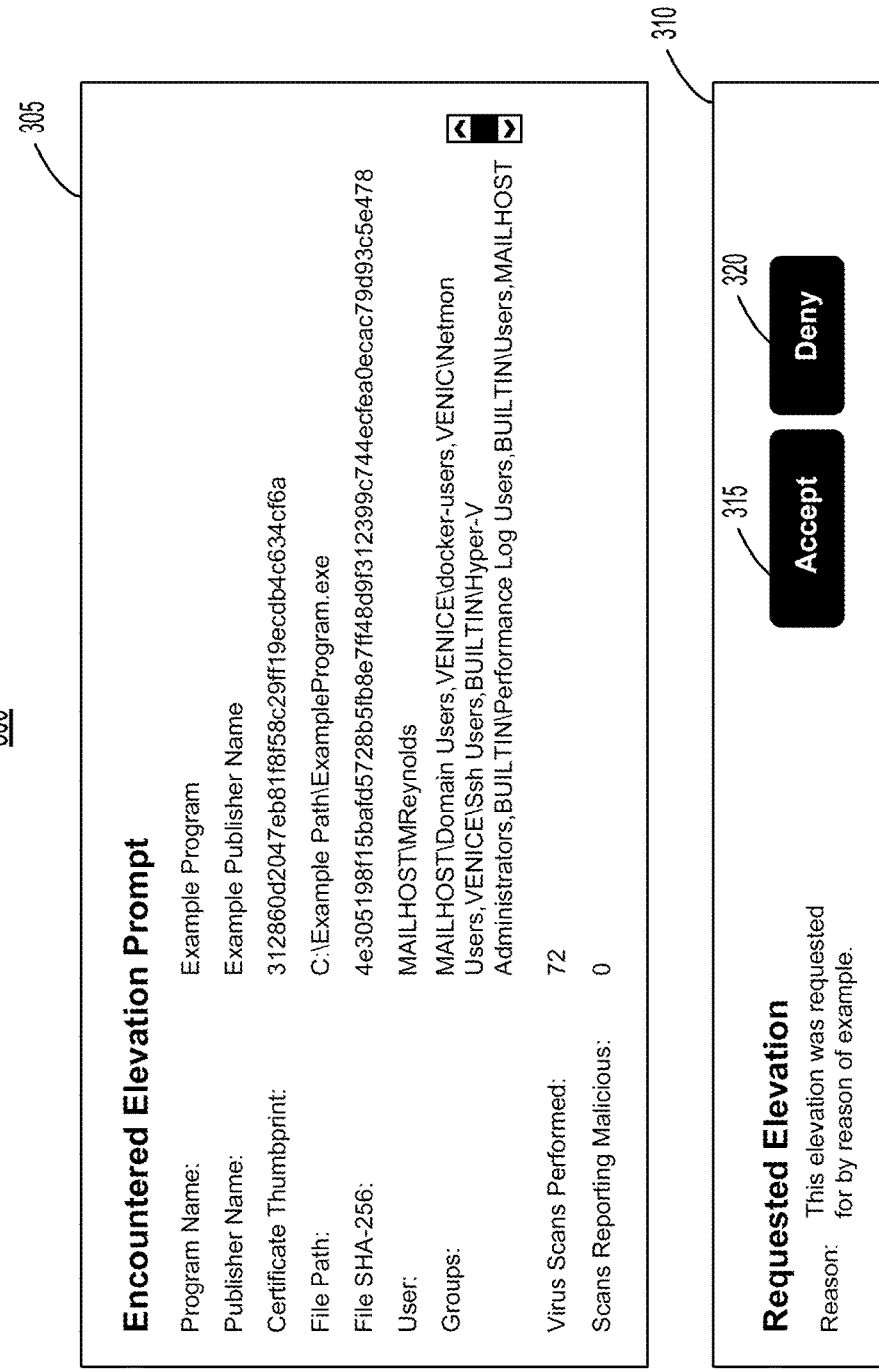
FIG. 3 depicts an example graphical user interface that may be displayed via a computer system when managing remote elevation of user privileges, in accordance with one or more implementations.

Referring to FIG. 3 in the context of the components described in connection with FIG. 1, depicted is an example graphical user interface 300 that may be displayed via a computer system (e.g., the remote computing device 112) to manage remote elevation of user privileges or login events, in accordance with one or more implementations. In this example, the remote computing device 122 may be operated by an administrator of the remote management system 102 that can manually approve or deny requests for elevated user privileges or logins. As shown, the interface provider 112 can access the logs 106 in the storage 104 to identify one or more pending requests for requests for elevated user privileges or logins that is indicated as requiring manual review. The interface provider 112 can then generate a graphical user interface, such as the graphical user interface 300, and provide the graphical user interface to the remote computing device 122. The example graphical user interface 300 shows an interface generated by the interface provider 112 upon detecting a pending request that requires approval.

The graphical user interface 300 is shown as including request information in the region 305, and interactive elements in the region 310. The request information can include any data associated with a request that is stored in the logs 106, including, for example, a program name of the program executed by the client device 120 that initiated the request for elevated user privileges, a publisher of the program, a file path identifying a storage location of the program, a file hash of the program, a username or account identifier of a user account used to transmit request for elevated user privileges, a group identifier for the user account, a total number of different virus scans performed on the program (e.g., via the remote server 160), and a total number of the different virus scans that reported at least one virus or malicious code in the program, among other data. In implementations where the request has been transmitted during a remote desktop session, the information displayed in the region 305 may include data relating to the remote desktop session that is gathered by the agent 134, such as the remote desktop session uptime, the client(s) of the remote desktop session, user account information (e.g., username, groups, authentication tokes, etc.) of the client(s) of the remote desktop session, identifiers of service tickets corresponding to the remote desktop session, among other data.

In this example, the region 305 of the interface 300 may appear in response to the request for elevation shown in FIGS. 2A and 2B. The region 305 of the interface 300 lists the program name as "Example Program," the program publisher as "Example Publisher Name," as well as a certificate thumbprint (e.g., extracted or determined by the agent 134 using one or more operating system 132 calls or thumbprint algorithms, etc.), as well as the SHA-256 hash of the "Example Program," and the username and group associations of the user requesting elevation for the "Example Program." Virus information shows that seventy-two scans have been performed on the program by the remote server 160, and that zero viruses or malicious code has been detected by the seventy-two scans.

Furthering this example, the region 310 includes a reason for elevation that is provided in the request (e.g., which may be provided at the client device 120 via the field 210 of FIG. 2A). The region 310 includes an interactive acceptance button 315 and an interactive denial button 320. Upon receiving an indication of an interaction with the interactive acceptance button 315, the interface provider 112 can provide a signal to the elevation manager 110 indicating that the request has been approved. Upon receiving an indication of an interaction with the interactive denial button 320, the interface provider 112 can provide a signal to the elevation manager 110 indicating that the request has been denied. Although the foregoing example has been described in connection with a request for elevated privileges, it should be understood that similar user interfaces, including any of the information described herein, may be displayed for administrative or standard login requests. In some implementations, the interface provider 112 may provide graphical user interfaces indicating one or more requests in the logs 106 that were automatically approved by the elevation manager 110 based on one or more rules 108.

The interface provider 112 can provide graphical user interfaces that enable an operator to establish or otherwise generate one or more rules 108 to automatically approve requests to elevate user privileges or for administrative or standard logins. Referring to FIG. 4, depicted is an example graphical user interface 400 that may be displayed via a computer system (e.g., the remote computing device 122, the client device 120, etc.) to create rules 108 for automatically managing remote elevation of user privileges and logins, in accordance with one or more implementations. In this example, the remote computing device 122 may be operated by an administrator of the remote management system 102 that can create rules to automatically elevate user privileges or provide logins.

As shown in this example, the interface provider 112 can access enumerate one or more conditions that may be utilized to create one or more rules 108. The conditions may be any condition that can be applied to any information received in a request for elevated privileges or logins. A rule 108 may include multiple conditions that are disjunctive (e.g., approve if condition A OR condition B are satisfied), conjunctive (e.g., approve if condition A AND condition B are satisfied), or combinations thereof (e.g., approve if condition A OR condition B and condition C are satisfied). The elevation manager 110 can determine whether to automatically approve a request by comparing the information in the request with the specified conditions of each rule 108. If the information in the request satisfies each condition in the rule, the elevation manager 110 can indicate that the request is automatically approved in the logs 106.

In this example, the graphical user interface 300 provides graphical elements that allow a user to specify actions for a new rule 108. The selectable radio bubbles in the region 405 enable selection of an action for the rule. In this example, the possible actions include "auto-elevate without user interaction," which causes the elevation manager 110 to automatically approve an elevation request satisfying the conditions of the rule 108, "auto-approve user elevation request," which causes the elevation manager 110 to automatically approve an elevation request satisfying the conditions of the rule 108, and "auto-deny user elevation request," which causes the elevation manager 110 to automatically deny an elevation request satisfying the conditions of the rule 108.

Furthering this example, the graphical user interface 400 provides graphical elements that allow a user to specify conditions for a new rule 108. The selectable check boxes in the region 410 enable an operator to enable one or more conditions for the new rule. The "Show Popular Conditions" dropdown menu can be utilized to add additional conditions to the conditions listed in the region 410. Additionally, text entry boxes or selectable dropdown menus can be utilized to assign values for each condition. In this example, the "Program Name," "Certificate Thumbprint" and "User" conditions are selected, with the values "Example Program," "312860d . . . ," and "MAILHOST\MReynolds," respectively. The values of the conditions are the values that the elevation manager 110 compares to the vales of information in received requests to determine whether the received requests satisfies the corresponding rule 108. In some implementations, the interface provider 112 may provide graphical elements to specify disjunctive, conjunctive, or combination disjunctive-conjunctive sets of conditions for a rule 108.

In this example, the graphical user interface 400 includes a field that enables an operator to specify a name for the rule, which may be provided via a text entry field. As shown, selecting the "Auto-generate" toggle causes the interface provider 112 to automatically generate a name for the rule 108 based on the selected conditions for the rule. Upon an interaction with the create button 415, the interface provider 112 can store the conditions for the new rule 108 in the storage 104, such that it may be accessed and utilized by the elevation manager 110 to automatically approve or deny requests. In some implementations, the interface provider 112 can provide additional graphical user interfaces that list the rules 108. In some implementations, the interface provider 112 can provide graphical user interfaces that enable an operator to enable or disable one or more of the rules 108. Rules 108 that are enabled may be used by the elevation manager 110 to evaluate requests described herein, and rules 108 that are disabled may be ignored by the elevation manager 110 and not used to evaluate requests (until they are re-enabled).

Referring back to FIG. 1, and to the operations of the elevation manager 110, upon determining to approve a request for elevated user privileges (e.g., an automatic or manual approval), the elevation manager 110 can generate a message to transmit to the agent 134 that provided the request. The message may indicate that the request has been approved, and can cause the agent 134 to generate authentication credentials with elevated user credentials. In some implementations, the elevation manager 110 can generate authentication credentials for the message, which the agent 134 can provide to the operating system 132. For example, the elevation manager 110 can generate one or more security tokens can be provided to an authentication API of the operating system 132 to grant access to elevated privileges (or an administrative or standard login, in some implementations).

To generate the user credentials with elevated privileges upon receiving the message from the elevation manager 110, the agent 134 can access one or more APIs of the operating system 132 to create an account (e.g., a normal account, a temporary account, etc.). A username and password for the generated account can be determined using a random alphanumeric string generator, for example. The agent 134 can locally maintain the username and password for the generated account. The agent 134 can then add the generated account to an administrator group or group with elevated privileges by modifying one or more settings (e.g., a registry, permission settings, etc.) of the operation system 132. In some implementations, the group to which the generated account is to be added may be determined or otherwise specified by the elevation manager 110. Once generated, the agent 134 can provide the credentials (e.g., username, password, etc.) for the generated account to an API of the operating system to satisfy the request for elevated user privileges. In some implementations, the agent 134 may automatically deactivate or delete the generated account from the registry of the operating system 132 once the actions requiring elevated credentials have been completed. For example, once the application that requested elevated credentials has been terminated, the agent 134 may automatically delete, de-activate, or demote (e.g., remove from the elevated group of the operating system 132) the generated account.

In some implementations, the elevation manager 110 may provide data (e.g., a key value, etc.) that the agent 134 can utilize to generate an authentication credential for the operating system 132 that grants elevated privileges (or an administrative or standard login, in some implementations). In some implementations, the elevation manager 110 may store sets of pre-generated authentication credentials that may be transmitted and utilized by the agents 134 of client devices 120 as described herein. In some implementations, the elevation manager 110 can generate an indication that the request is approved, and the agent 134 can receive the indication and utilize an API of the operating system 132 elevate user privileges (or activate an administrative or standard login session, in some implementations). The message can then be provided to the agent 134. Upon generating the message, the elevation manager 110 can store an indication in the logs 106 that the respective request has been approved. If the elevation manager 110 denies the request (or receives a manual denial for a request from the interface provider 112), the elevation manager 110 can transmit an indication that the request was denied to the agent 134. The agent 134 may display the error in one or more user interfaces, such as within a prompt similar to the prompt shown in FIGS. 2A and 2B.

Figure 5:
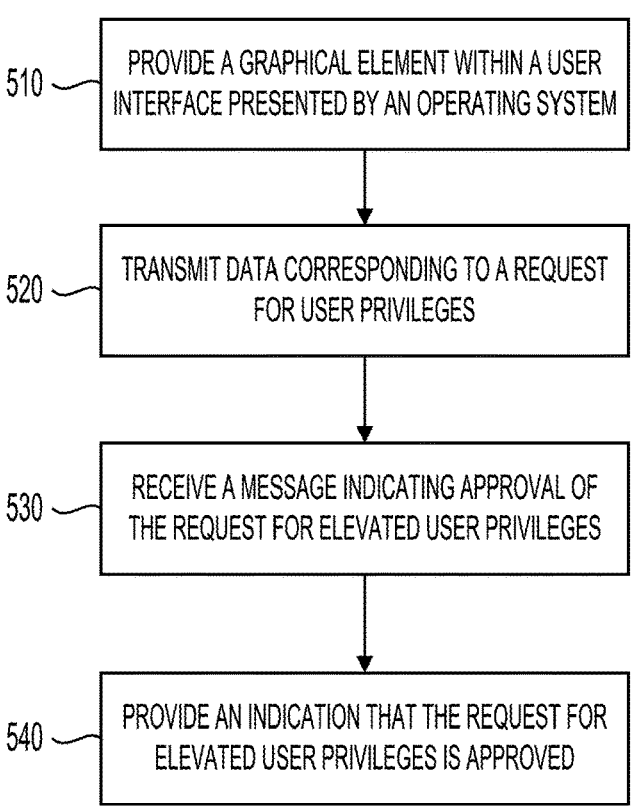
FIG. 5 depicts an illustrative flow diagram of an example method for end user privilege elevation, in accordance with one or more implementations.

FIG. 5 depicts an illustrative flow diagram of an example method 500 for end user privilege elevation, in accordance with one or more implementations. The functionalities or operations of the method 500 may be implemented using, or performed by the components detailed herein in connection with FIG. 1. For example, one or more of the operations of the method 500 may be performed by the client device 120, the agent 134 of the client device 120, or in some implementations, the remote management system 102. Although the example operations of the method 500 are described as being performed by an agent (e.g., the agent 134) executing on a client device (e.g., the client device 120), it should be understood that any computing system (or combination of computing systems) may perform the operations described herein.

In brief overview, an agent executing on a client device can provide a graphical element within a user interface presented by an operating system at operation 510. The agent can transmit data corresponding to a request for user privileges at operation 520. The agent can receive a message indicating approval of the request for elevated user privileges at operation 530. The agent can provide an indication that the request for elevated user privileges is approved at operation 540. Although the various operations of the method 500 are shown as being performed in a particular order, it should be understood that the operations may be performed in any order to achieve useful results. Additionally, it should be understood that the operations of the method 500 may be performed in addition to or as an alternative to one or more of the operations of the method 600 described in connection with FIG. 6.

Referring to operation 510, an agent (e.g., the agent 134) executing on a client device (e.g., the client device 120) can provide a graphical element within a user interface presented by an operating system (e.g., the operating system 132) of the client device responsive to detection of a request for elevated user privileges. As described herein, the operating system of a client device can present a prompt upon detecting a request for elevated user privileges. Upon detecting that a user or program has requested elevated user preferences, the operating system can generate and present a prompt, such as the prompt described in connection with FIGS. 2A and 2B. To generate the prompt, the operating system may invoke functionality of the agent. To do so, the can access a registry of the operating system to identify the agent. The agent may be identified by a corresponding entry in the registry. The entry can indicate that the agent should be executed or otherwise invoked upon detection of a request for elevated user privileges. In some implementations, the client device can generate an entry identifying the agent in a registry of the operating system when the agent is installed. In some implementations, the agent may be provided by the remote management system (e.g., the remote management system 102), a remote server (e.g., the remote server 160), or another computing system.

The operating system can execute the agent, which can generate one or more graphical elements for display in a prompt provided by the operating system. The agent may be stored in memory of the client device as a dynamic library. Further details of the functionality of the agent are described in connection with FIGS. 2A and 2B. The agent can provide executable instructions, data, or metadata that causes generation of a region in the prompt that includes one or more graphical elements. The region can include a text-entry field, which can receive user-entered text describing a reason that elevated user privileges are requested. The region can include an elevation graphical element. Upon an interaction with the elevation graphical element, the agent can execute instructions that modify the appearance of region of the prompt, as shown in FIG. 2B. For example, the agent can modify the prompt to remove the interactive graphical elements, and in their place, display an indication that elevated user privileges have been requested. In some implementations, the agent may be executed in response to a login prompt provided by the operating system. For example, the agent may be executed in order to request a login (e.g., an administrative login credential, a standard login credential) to access a session of the client device.

Referring to operation 520, upon an interaction with the graphical elevation element, the agent can transmit, to a server, data corresponding to the request for elevated user privileges. For example, the agent can determine and transmit data corresponding to the request for elevated user privileges to a remote management system (e.g., the remote management system 102). The data can include any information relating to the program requesting elevated privileges, the user account requesting privileges, the client device, and the agent, among other data. The agent can determine the data to transmit to the remote management system by accessing and parsing metadata of the program, registry entries corresponding to the program, registry entries corresponding to the client device, or by executing one or more operating system API calls. In some implementations, the agent can transmit, to a second server (e.g., the remote server 160), the program file corresponding to the request for elevated user privileges, and receive virus scan data generated based on the file from the remote server. The virus scan data can be included in the request, as described herein.

The agent may generate a timestamp corresponding to the request for elevated user privileges, and include the timestamp in the request. In some implementations, the agent may generate a hash or a certificate thumbprint of the program using one or more operating system API calls or function calls. The hash or certificate thumbprint can be included in the request transmitted to the remote management server. Further details of the data transmitted to the remote management system are described in connection with FIG. 3. In some implementations, if a response to the request is not received within a predetermined timeframe, the agent may issue an error and timeout the request.

Referring to operation 530, the agent can receive, from the server, a message indicating approval of the request for elevated user privileges. As described herein, the remote management system can determine whether to approve or deny the request based on automatic rules (e.g., the rules 108) or based on manual review and input. Upon approval of the request, the remote management system can transmit a message to the agent indicating the approval. In some implementations, the message can include one more credentials maintained or generated by the remote management system. The message may be transmitted to the agent via a network (e.g., the network 105).

Referring to operation 540, the agent can provide, to the operating system of the client device, an indication that the request for elevated user privileges is approved. In some implementations, the message includes one more credentials maintained or generated by the remote management system, which agent can provide to the operating system to satisfy the requirements to elevate user privileges (or administrative or standard login). In some implementations, the agent itself may generate one or more credentials based on information (e.g., security tokens, private keys, etc.) received from the remote management system. The agent can then provide the credential to the operating system to satisfy the requirements to elevate user privileges. In some implementations, the agent can provide an indication that the request for elevated privileges has been approved by the remote management system to the operating system, which can then grant the elevated privileges accordingly. The indication (or the credentials) may be provided to the operating system via one or more APIs of the operating system.

Figure 6:
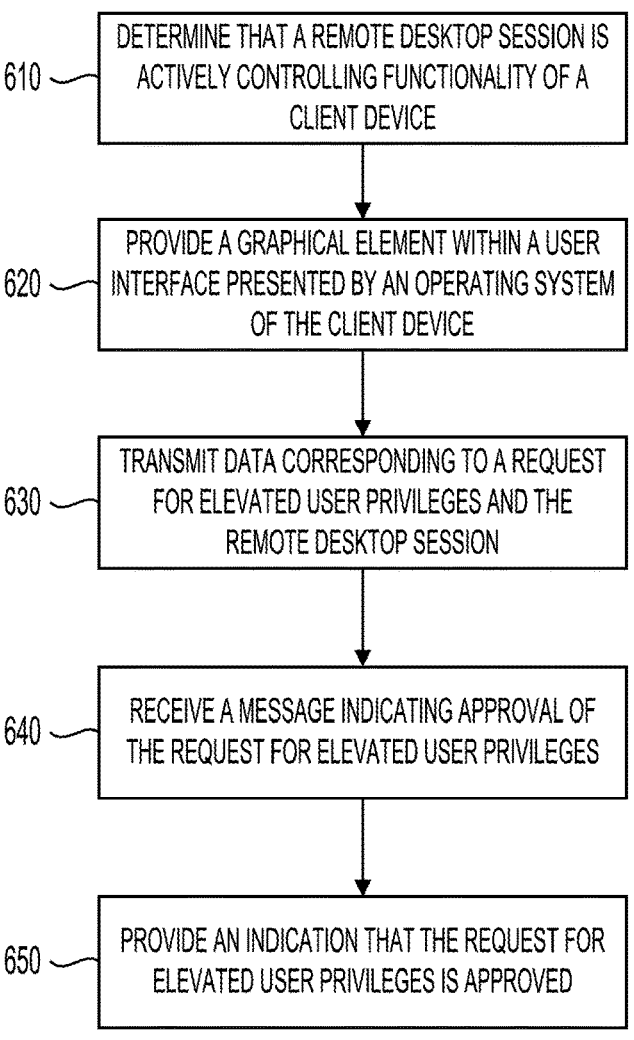
FIG. 6 depicts an illustrative flow diagram of an example method for anonymous administrative login, in accordance with one or more implementations.

FIG. 6 depicts an illustrative flow diagram of an example method for anonymous administrative login, in accordance with one or more implementations. The functionalities or operations of the method 600 may be implemented using, or performed by the components detailed herein in connection with FIG. 1. For example, one or more of the operations of the method 600 may be performed by the client device 120, the agent 134 of the client device 120, or in some implementations, the remote management system 102. Although the example operations of the method 600 are described as being performed by an agent (e.g., the agent 134) executing on a client device (e.g., the client device 120), it should be understood that any computing system (or combination of computing systems) may perform the operations described herein.

In brief overview, an agent executing on a client device can determine that a remote desktop session is actively controlling functionality of the client device at operation 610. The agent can provide a graphical element within a user interface presented by an operating system at operation 620. The agent can transmit data corresponding to a request for user privileges and the remote desktop session at operation 630. The agent can receive a message indicating approval of the request for elevated user privileges at operation 640. The agent can provide an indication that the request for elevated user privileges is approved at operation 650. Although the various operations of the method 600 are shown as being performed in a particular order, it should be understood that the operations may be performed in any order to achieve useful results. Additionally, it should be understood that the operations of the method 600 may be performed in addition to or as an alternative to one or more of the operations of the method 500 described in connection with FIG. 5.

Referring to operation 610, an agent (e.g., the agent 134) executing on a client device (e.g., the client device 120) can determine that a remote desktop session is actively controlling functionality of the client device. In a remote desktop session, input and actions at a remote computing device (e.g., the remote computing device 122) can be transmitted to the client device, which processes the input as if the input were happening locally and sends updated graphical interface data back to the remote computing device. To determine whether a remote desktop session is actively controlling functionality of the client device, the agent may access one or more APIs of the operating system to enumerate each session that is active on the client device. One session can be a user session, which is provided by the operating system when a user locally logs into the client device using credentials or via the techniques described in further detail herein. The remote desktop session may also be enumerated and identified by the agent using such APIs. In some implementations, the agent can access one or more registry entries of the registry of the operating system that indicate whether a remote desktop session is actively controlling functionality of the client device.

As described in connection with operation 510 of FIG. 5, the agent may be executed by the operating system of the client device upon detecting functionality requiring elevated user privileges, or upon detecting a login screen at the operating system (e.g., a request for administrative or standard login, etc.). The agent may determine that a remote desktop session is actively controlling functionality of the client device when invoked by the operating system. If the agent determines that a remote desktop session is not actively controlling the client device, the agent may terminate, or provide a signal to the operating system indicating that an alternative prompt or graphical elements should be displayed. In some implementations, the agent can determine that the remote desktop session is actively controlling functionality of the client device by determining that the remote desktop session initiated the request for elevated user privileges. For example, if the program requesting elevated privileges identifies the remote desktop session as the session that initiated the program, or utilized to program to perform the activity that requires elevated privileges, the agent can determine that the remote desktop session is actively controlling functionality of the client device.

Referring to operation 620, the agent can provide a graphical element within a user interface presented by an operating system. If the agent determines that a remote desktop session is actively controlling functionality of the client device, the agent can provide the graphical element of the prompt provided by the operating system, as shown in FIGS. 2A and 2B. To provide the graphical elements, the agent can perform the operations described in connection with the agent 134, or any of the operations described in connection with operation 510 of FIG. 5. In some implementations, the agent can determine that the remote desktop session is not actively controlling functionality of the client device. In such implementations, the agent may provide an indication not to display the graphical element within the prompt provided by the operating system. The indication may cause the operating system to present default or alternative graphical elements on the prompt without necessarily further executing the agent.

Although determining a remote desktop session is actively controlling the client device has been provided as one criteria for presenting the graphical element, it should be understood that the agent can determine whether to provide the graphical element in response to any suitable condition. A non-limiting set of example conditions include if a remote desktop session is actively controlling the client device, if the current time is within a specified date or time range, if the remote computing device or remote user accessing the client device via remote desktop satisfies one or more criteria (e.g., is using a predetermined username or identifier, if the remote computing device has a predetermined device identifier, etc.), or if the remote desktop session is controlling the client device within a specified date or time range, among other conditions. The agent can evaluate the one or more conditions against the state information of the client device to determine whether to present the graphical element, as described herein.

In some implementations, the agent may maintain the one or more conditions to present the graphical element locally at the client device. In some implementations, the agent may access the remote management system to retrieve the one or more conditions. In some implementations, the agent may transmit a request for authorization to present the graphical element to the remote computing system. The request may include any information about the state of the client device (e.g., including any information relating to the various example conditions described herein) or the application requesting elevated user privileges. In some implementations, the remote management system can receive the request and evaluate whether the state or application information satisfies the request to present the graphical element. If the one or more conditions are satisfied, the remote management server can transmit an indication that causes the agent to present the graphical element as described herein. Otherwise, the remote management system can transmit an indication that the condition has not met, which can cause the agent to forgo presenting the graphical element, as described herein.

Referring to operation 630, the agent can transmit data corresponding to a request for user privileges and the remote desktop session. Upon an interaction with the graphical elevation element, the agent can transmit, to a server, data corresponding to the request for elevated user privileges. For example, the agent can determine and transmit data corresponding to the request for elevated user privileges to a remote management system (e.g., the remote management system 102). The data can include any information relating to the program requesting elevated privileges, the user account requesting privileges, the client device, and the agent, among other data. The agent can determine the data to transmit to the remote management system by accessing and parsing metadata of the program, registry entries corresponding to the program, registry entries corresponding to the client device, or by executing one or more operating system API calls. In some implementations, the agent can transmit, to a second server (e.g., the remote server 160), the program file corresponding to the request for elevated user privileges, and receive virus scan data generated based on the file from the remote server. The virus scan data can be included in the request, as described herein.

The agent may generate a timestamp corresponding to the request for elevated user privileges, and include the timestamp in the request. In some implementations, the agent may generate a hash or a certificate thumbprint of the program using one or more operating system API calls or function calls. The hash or certificate thumbprint can be included in the request transmitted to the remote management server. Further details of the data transmitted to the remote management system are described in connection with FIG. 3. In some implementations, if a response to the request is not received within a predetermined timeframe, the agent may issue an error and timeout the request. Data relating to the remote desktop session included in the request may include one or more identifiers of a user of a remote computing device (e.g., the remote computing device 122) that is requesting elevated user privileges via the remote desktop session, or requesting administrative or standard login to initiate a remote desktop session, identifier(s) or data relating to the remote computing device, information relating to the remote desktop session such as the remote desktop session uptime, user account information (e.g., username, groups, authentication tokes, etc.) of the user accessing or attempting to access or initiate the remote desktop session, identifiers of service tickets corresponding to the remote desktop session, among other data. The data relating to the remote desktop session can be determined by accessing registry data, session data via API calls of the operating system, or other configuration data stored in the file system of the client device. To transmit data corresponding to the request for user privileges and the remote desktop session, the agent can perform any of the operations described in connection with the agent 134, or any of the operations described in connection with operation 520 of FIG. 5.

Referring to operation 640, the agent can receive a message indicating approval of the request for elevated user privileges. As described herein, the remote management system can determine whether to approve or deny the request based on automatic rules (e.g., the rules 108) or based on manual review and input. Upon approval of the request, the remote management system can transmit a message to the agent indicating the approval. In some implementations, the message can include one more credentials maintained or generated by the remote management system. The message may be transmitted to the agent via a network (e.g., the network 105). In some implementations, the credentials can be generated for the remote desktop session (e.g., to initiate the remote desktop session, to be utilized by the operating system during the remote desktop session, etc.).

Referring to operation 650, the agent can provide an indication that the request for elevated user privileges is approved. In some implementations, the message includes one more credentials maintained or generated by the remote management system, which agent can provide to the operating system to satisfy the requirements to elevate user privileges (or administrative or standard login). In some implementations, the agent itself may generate one or more credentials based on information (e.g., security tokens, private keys, etc.) received from the remote management system. The agent can then provide the credential to the operating system to satisfy the requirements to elevate user privileges. In some implementations, the agent can provide an indication that the request for elevated privileges has been approved by the remote management system to the operating system, which can then grant the elevated privileges accordingly. The indication (or the credentials) may be provided to the operating system via one or more APIs of the operating system.

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method, comprising:
determining, by an agent executing on a client device, that a remote desktop session is actively controlling functionality of the client device;
providing, by the agent, a graphical element within a user interface presented by an operating system of the client device responsive to detection of a request for elevated user privileges via the remote desktop session;
determining, by the agent, an identifier of a remote computing device that is utilizing the remote desktop session to control the client device;
responsive to an interaction with the graphical element, transmitting, by the agent to a server, data corresponding to the request for elevated user privileges and the remote desktop session, the data comprising the identifier of the remote computing device and an identifier of a remote user profile used to initiate the remote desktop session;
receiving, by the agent from the server, a message indicating approval of the request for elevated user privileges; and
providing, by the agent to the operating system of the client device, an indication that the request for elevated user privileges is approved.

2. The method of claim 1, further comprising:
determining, by the agent, that the remote desktop session is not actively controlling functionality of the client device; and
providing, by the agent, an indication not to display the graphical element within a second user interface provided by the operating system responsive to detection of a second request for elevated user privileges.

3. The method of claim 1, wherein determining that the remote desktop session is actively controlling functionality of the client device comprises accessing, by the agent, information stored on the client device that indicates the remote desktop session is active.

4. The method of claim 1, further comprising generating, by the client device, an entry identifying the agent in a registry of the operating system.

5. The method of claim 1, further comprising determining, by the agent, one or more of a program name of a program executed by the client device that initiated the request for elevated user privileges, a publisher of the program, a file path identifying a storage location of the program, or a file hash of the program.

6. The method of claim 1, wherein the message comprises an authentication credential for the operating system that is generated for the remote desktop session, and providing the indication that the request for elevated user privileges is approved comprises providing the authentication credential to the operating system.

7. The method of claim 1, further comprising storing, by the client device, the agent in memory of the client device as a dynamic library.

8. The method of claim 1, wherein determining that the remote desktop session is actively controlling functionality of the client device comprises determining that the remote desktop session initiated the request for elevated user privileges.

9. A system, comprising:

a client device that executes an agent that:

determines that a remote desktop session is actively controlling functionality of the client device;

provides a graphical element within a user interface presented by an operating system of the client device responsive to detection of a request for elevated user privileges via the remote desktop session;

determines, by the agent, an identifier of a remote computing device that is utilizing the remote desktop session to control the client device;

responsive to an interaction with the graphical element, transmits, to a server, data corresponding to the request for elevated user privileges and the remote desktop session, the data comprising the identifier of the remote computing device to the server and an identifier of a remote user profile used to initiate the remote desktop session;

receives, from the server, a message indicating approval of the request for elevated user privileges; and provides, to the operating system of the client device, an indication that the request for elevated user privileges is approved.

10. The system of claim 9, wherein the agent further:

determines that the remote desktop session is not actively controlling functionality of the client device; and provides an indication not to display the graphical element within a second user interface provided by the operating system responsive to detection of a second request for elevated user privileges.

11. The system of claim 9, wherein the agent further determines that the remote desktop session is actively controlling functionality of the client device by accessing information stored on the client device that indicates the remote desktop session is active.

12. The system of claim 9, wherein the agent further generates an entry identifying the agent in a registry of the operating system.

13. The system of claim 11, wherein the agent further determines one or more of a program name of a program executed by the client device that initiated the request for elevated user privileges, a publisher of the program, a file path identifying a storage location of the program, or a file hash of the program.

14. The system of claim 11, wherein the message comprises an authentication credential for the operating system that is generated for the remote desktop session, and the agent further provides the indication that the request for elevated user privileges is approved by providing the authentication credential to the operating system.

15. The system of claim 9, wherein the client device further stores the agent in memory of the client device as a dynamic library.

16. The system of claim 9, wherein the agent further determines that the remote desktop session is actively controlling functionality of the client device by determining that the remote desktop session initiated the request for elevated user privileges.

* * * * *